United States Patent
Tatsukawa et al.

(10) Patent No.: US 6,891,333 B2
(45) Date of Patent: May 10, 2005

(54) VEHICLE HEADLAMP

(75) Inventors: Masashi Tatsukawa, Shizuoka (JP); Hiroyuki Ishida, Shizuoka (JP); Kiyoshi Sazuka, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/652,241

(22) Filed: Sep. 2, 2003

(65) Prior Publication Data

US 2004/0120158 A1 Jun. 24, 2004

(30) Foreign Application Priority Data

Sep. 3, 2002 (JP) .................................. P.2002-258101

(51) Int. Cl.$^7$ .............................................. B60Q 1/02
(52) U.S. Cl. ...................... 315/82; 362/507; 362/544; 362/800
(58) Field of Search .............................. 315/77, 82, 76; 362/543–545, 538, 539, 517, 507, 459, 800

(56) References Cited

U.S. PATENT DOCUMENTS

| | | | | |
|---|---|---|---|---|
| 5,803,579 A | * | 9/1998 | Turnbull et al. | 362/800 |
| 5,975,730 A | * | 11/1999 | Neumann et al. | 362/517 |
| 6,406,172 B1 | * | 6/2002 | Harbers et al. | 362/545 |
| 6,511,215 B2 | * | 1/2003 | Hashigaya | 362/544 |
| 6,565,247 B2 | * | 5/2003 | Thominet | 362/545 |
| 6,619,825 B2 | * | 9/2003 | Natsume | 362/545 |
| 2001/0019486 A1 | | 9/2001 | Thominet | 362/543 |
| 2002/0067618 A1 | | 6/2002 | Woemer et al. | 362/511 |
| 2004/0042212 A1 | * | 3/2004 | Du et al. | 362/296 |

FOREIGN PATENT DOCUMENTS

| | | |
|---|---|---|
| DE | 201 15 801 U1 | 3/2002 |
| DE | 202 06 833 U1 | 7/2002 |
| GB | 2 365 962 A | 2/2002 |
| JP | 2001-266620 A | 9/2001 |
| JP | 2002-50214 A | 2/2002 |
| WO | WO 01/01038 A1 | 1/2001 |

* cited by examiner

*Primary Examiner*—Don Wong
*Assistant Examiner*—Ephrem Alemu
(74) *Attorney, Agent, or Firm*—Sughrue Mion, PLLC

(57) ABSTRACT

A vehicle headlamp is constituted to have a plurality of lamp units having light-emitting diodes as light sources. At that time, three types of lamp units of different radiation modes; that is, a projector-type lamp unit, direct-projection-type lamp units, and a reflection-type lamp unit, are used as the plurality of lamp units. As a result, a low-beam light distribution pattern obtained as a merged light distribution pattern formed from the light rays output from these three types of lamp units can be readily formed in a desired pattern geometry and a desired distribution of luminous intensity.

7 Claims, 13 Drawing Sheets

VEHICLE HEADLAMP

BACKGROUND OF THE INVENTION

1. Field of the Invention

The invention relates to a vehicle headlamp configured to form a predetermined light distribution pattern. More particularly, the invention relates to a vehicle headlamp using a plurality of lamp units having light-emitting diodes as light sources including a projector-type lamp unit, a direct-projection-type lamp unit, and a reflection-type lamp unit.

2. Description of the Related Art

A light-emitting diode has been used as a light source of a vehicle marker lamp such as a tail lamp. For instance, JP-A-2002-50214 describes a vehicle marker lamp in which a plurality of lamp units, each unit using a light-emitting diode as a light source, are arranged.

JP-A-2001-266620 describes a vehicle headlamp. The headlamp is constructed such that a desired light distribution pattern is formed by selectively illuminating a portion of a plurality of light-emitting diodes arranged in a matrix layout.

The lamp configuration described in JP-A-2001-266620 enables changing of the shape of a light distribution pattern by division into an illuminating region and a non-illuminating region, but encounters difficulty in forming a light distribution pattern with a desired distribution of luminous intensity.

Another conceivable lamp configuration can be applied to the vehicle headlamp, such as that described in JP-A-2002-50214, wherein a plurality of lamp units, each unit employing a light-emitting diode as a light source, are arranged. However, in such a case the following problem will arise.

Mere use of a plurality of identical lamp units in the manner as described in JP-A-2002-50214 results in light distribution patterns formed through radiation of light from the respective lamp units becoming identical with each other in terms of a pattern geometry and the distribution of luminous intensity. Therefore, there arises a problem of a failure to form a light distribution pattern of a vehicle headlamp obtained as a merged light distribution pattern in the form of a desired pattern geometry and a desired distribution of luminous intensity.

The invention has been conceived in view of the aforementioned circumstances and aims at providing a vehicle headlamp which is constructed to form a predetermined light distribution pattern and enables formation of a light distribution pattern in a desired pattern geometry and a desired distribution of luminous intensity even when a semiconductor light-emitting element is used as a light source of the headlamp.

SUMMARY OF THE INVENTION

The present invention aims at achieving the object by adopting a configuration having a plurality of lamp units using semiconductor light-emitting elements as light sources and using a plurality of types of lamp units of different radiation modes.

Specifically, a vehicle headlamp of the invention is constructed so as to form a predetermined light distribution pattern and comprises:

a plurality of lamp units employing semiconductor light-emitting elements as light sources, wherein used as the plurality of lamp unit are at least two types of lamp units selected from a lamp unit of projector type which is constructed to gather and reflect in a forward direction light output from a light source by means of a reflector and to radiate the reflected light ahead of a lamp by way of a projection lens provided ahead of the reflector, from a lamp unit of direct reflection type which is constructed to radiate direct light output from the light source ahead of the lamp by way of a condenser lens provided forward of the light source, and from a lamp unit of reflection type which is constructed to reflect light output from the light source ahead of the lamp by means of the reflector.

Here, the term "vehicle" can apply to any number of transportation modes such as, for example, an automobile, a railcar, etc.

The term "predetermined light distribution pattern" may be a low-beam light distribution pattern or a high-beam light distribution pattern.

The "semiconductor light-emitting element" is not limited to any specific type. For example, a light-emitting diode, a laser diode, or a like element can be adopted. Moreover, the configuration of the "semiconductor light-emitting element" is not limited to a specific configuration. For instance, a single light-emitting chip may be packaged, or a plurality of light-emitting chips may be packaged.

The "lamp unit of projector type," the "lamp unit of direct projection type," and the "lamp unit of reflection type" are not limited to any specific lamp configurations. An arbitrary number of lamp units may be of the same type.

As shown by the above-described configurations, a vehicle headlamp of the invention is equipped with a plurality of lamp units employing semiconductor light-emitting elements as light sources, wherein used as the plurality of lamp units are at least two types of lamp units selected from a lamp unit of projector type, a lamp unit of direct projection type, and a lamp unit of reflection type. Hence, the following working-effect can be yielded.

Specifically, use of lamp units of different radiation modes, such as a lamp unit of projector type, a lamp unit of direct projection type, and a lamp unit of reflection type, enables easy formation of light distribution patterns having different light distribution characteristics.

Consequently, so long as at least two types of lamp units selected from these three types of lamp units are used and the light distribution characteristics of light distribution patterns to be formed by the respective lamp units are set optimally for constituting a portion of an intended light distribution pattern of a vehicle headlamp, a light distribution pattern of a vehicle headlamp having a desired pattern geometry and a desired distribution of luminous intensity can be obtained as a merged light distribution pattern.

According to the invention, the vehicle headlamp constituted so as to form a predetermined light distribution pattern can form a light distribution pattern in the form of a desired pattern geometry and a desired distribution of luminous intensity even when a semiconductor light-emitting element is used as a light source of the headlamp.

The vehicle headlamp of the invention is configured to include a plurality of lamp units, each unit using a semiconductor light-emitting element as a light source. Hence, each lamp unit can be miniaturized. As such, a degree of freedom of shape of a vehicle headlamp can be increased, thereby enabling an attempt to render the vehicle headlamp compact.

The lamp unit of projector type is designed to project forward an image formed on a focal plane located rearward of the projection lens, and hence a cut-off line having a high contrast ratio can be formed readily. Therefore, when light is radiated in the form of a low-beam light distribution pattern through use of the foregoing configuration, occurrence of upward light responsible for glaring can be minimized, so long as a cut-off line of low-beam light distribution pattern is formed by means of the lamp unit of projector type.

DETAILED DESCRIPTION OF THE INVENTION

An embodiment of the invention will be described hereinbelow by reference to the drawings.

Figure 1:
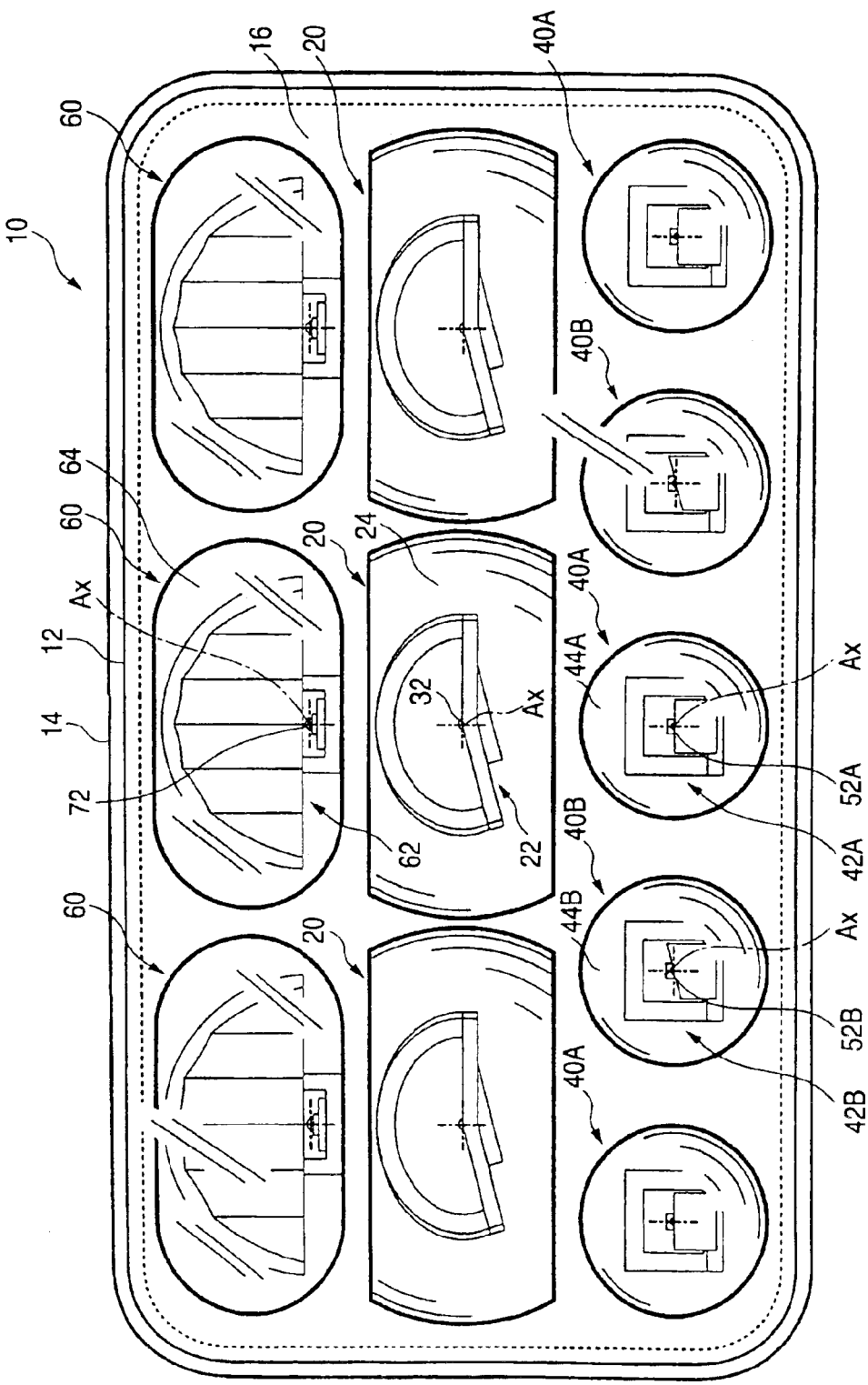
FIG. 1 is a front view showing a vehicle headlamp according to an embodiment of the invention.

FIG. 1 is a front view showing a vehicle headlamp 10 according to an embodiment of the invention.

The vehicle headlamp 10 is a low-beam headlamp. The headlamp is constituted so as to house eleven lamp units 20, 40A, 40B, and 60 in three rows within a lamp chamber, which is formed from a transparent, translucent cover 12 and a lamp body 14.

Figure 2:
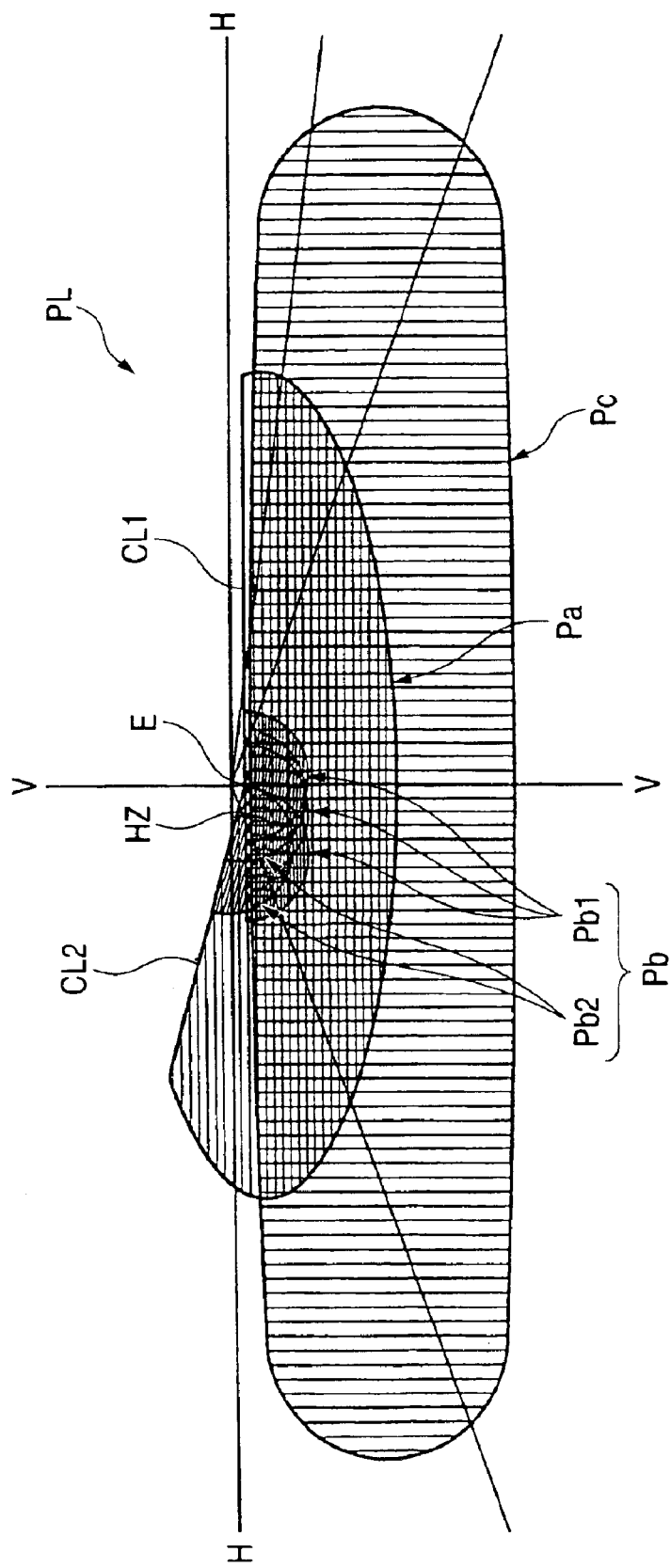
FIG. 2 is a perspective view showing a low-beam light distribution pattern to be formed on a virtual vertical screen located 25 m ahead of a lamp, by means of radiation of light output from the vehicle headlamp.

FIG. 2 is a perspective view for showing a low-beam light distribution pattern PL formed on a virtual vertical screen placed at a position 25 m ahead of a lamp by means of the light output forward from the vehicle headlamp 10.

The low-beam light distribution pattern PL is a left light distribution pattern having a horizontal cut-off line CL1 and an oblique cut-off line CL2 provided at an upper end of the light distribution pattern. The position of an elbow point E, which is a point of intersection of the cut-off lines CL1 and CL2, is set to a location situated about 0.5° to 0.6° lower than a point H–V, which is a focal point located in front of the lamp. A hot zone HZ, which is a high-intensity area, is formed in the low-beam light distribution pattern PL so as to surround a point located slightly to the left of the elbow point E.

The low-beam light distribution pattern PL is formed as a merged light distribution pattern from a cut-off line formation pattern Pa, a hot zone formation pattern Pb, and a diffusion area formation pattern Pc.

The cut-off line formation pattern Pa is a light distribution pattern to be used for forming the horizontal cut-off line CL1 and the oblique cut-off line CL2. The cut-off line formation pattern Pa is formed by the three lamp units 20 provided in a middle row.

The hot zone formation pattern Pb is a comparatively small light distribution pattern to be used for forming the hot zone HZ and is formed from three small light distribution patterns Pb1 having straight upper edges aligned with the horizontal cut-off line CL1 and from two small light distribution patterns Pb2 having straight upper edges aligned with the oblique cut-off line CL2. The three small light distribution patterns Pb1 are formed by means of radiation of light output from the three lamp units 40A provided at every other position in a lower row. The two small light distribution patterns Pb2 are formed by means of the remaining two lamp units 40B disposed in the lower row.

The diffusion area formation pattern Pc is a light distribution pattern to be used for forming a diffusion area of the low-beam light distribution pattern PL. The diffusion area formation pattern Pc is formed at a position below the horizontal cut-off line CL1 as a light distribution pattern which is larger than the cut-off line formation pattern Pa. The diffusion area formation pattern Pc is formed by means of the three lamp units 60 disposed in an upper row.

Each of the lamp units 20 serving as cut-off line formation units is constituted as a projector-type lamp unit formed from a light source unit 22 and a projection lens 24 provided forward thereof. The lamp units 40A, 40B serving as hot zone formation units are constituted as lamp units of direct projection type, wherein the lamp unit 40A is formed from a light source unit 42A and a condenser lens 44A provided forward thereof and the lamp unit 40B is formed from a light source unit 42B and a condenser lens 44B provided forward thereof. The lamp unit 60 serving as a diffusion area formation unit is constituted as a reflection-type lamp unit formed from a light source unit 62 and a transparent, translucent plate 64 provided forward thereof.

The respective lamp units 20, 60 are arranged such that the optical axes Ax of the lamp units 20, 60 extend in the longitudinal direction of the vehicle. The lamp units 40A, 40B are arranged such that the optical axes Ax of the lamp units extend in directions slightly deviated from the longitudinal direction of the vehicle for each lamp unit. More precisely, the respective optical axes Ax of the lamp units 20, 40A, 40B, and 60 extend in directions oriented downward by about 0.5° to 0.6° with respect to the horizontal direction.

The projection lenses 24 are formed in the form of a horizontal oblate shape when the lamp is viewed from the front. The condenser lenses 44A, 44B are formed in a circular shape when the lamp is viewed from the front. The translucent plate 64 is formed into a horizontal, flat oval shape when the lamp is viewed from the front. An inner panel 16 formed so as to surround the projection lenses 24, the condenser lenses 44A, 44B, and the translucent plate 64 is provided within the lamp chamber.

Specific configurations of the respective lamp units 20, 40A, 40B, and 60 will now be described.

First, the configuration of the projector-type lamp unit 20 will be described.

Figure 3:
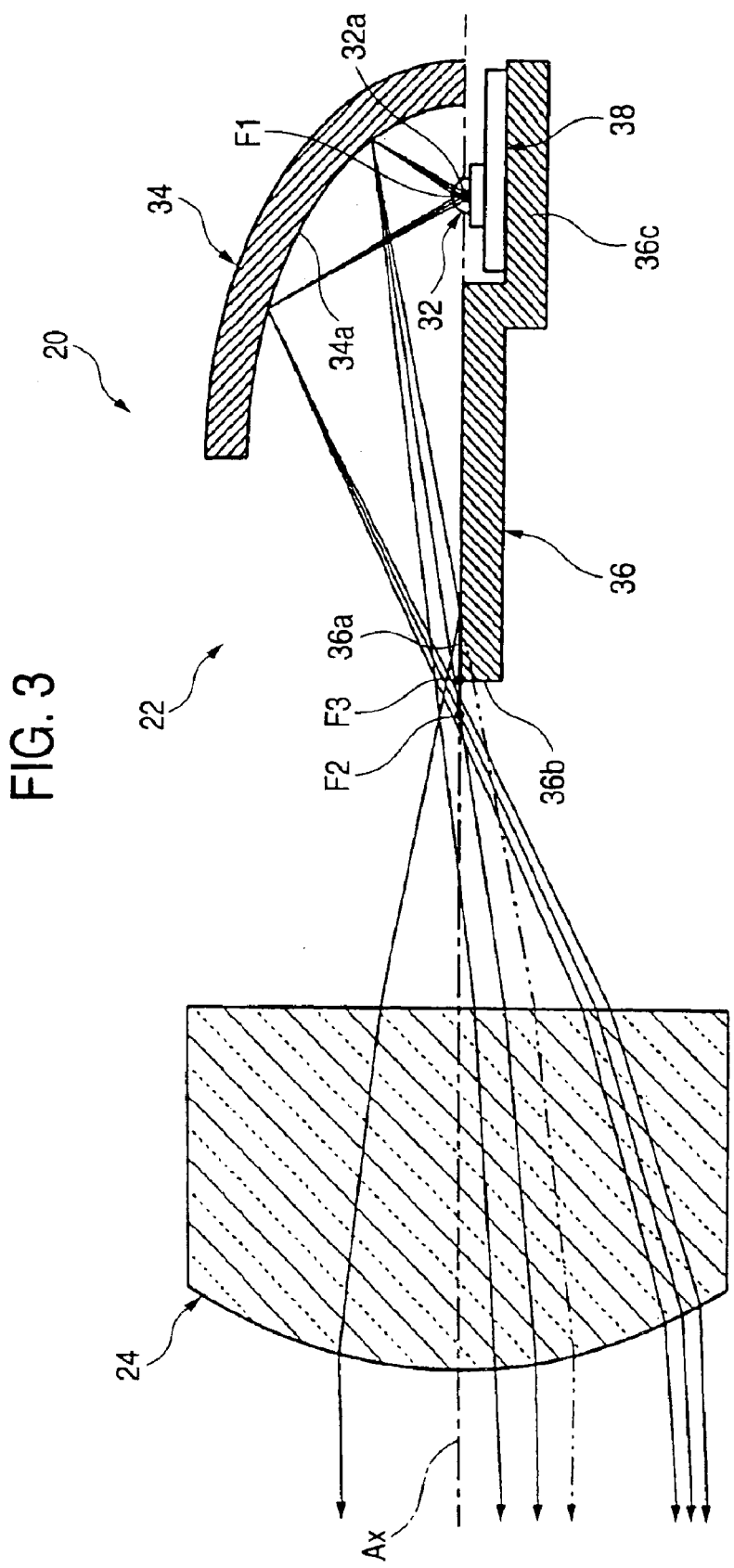
FIG. 3 is a side cross-sectional view showing a projector-type lamp unit of the vehicle headlamp as a single article.
Figure 4:
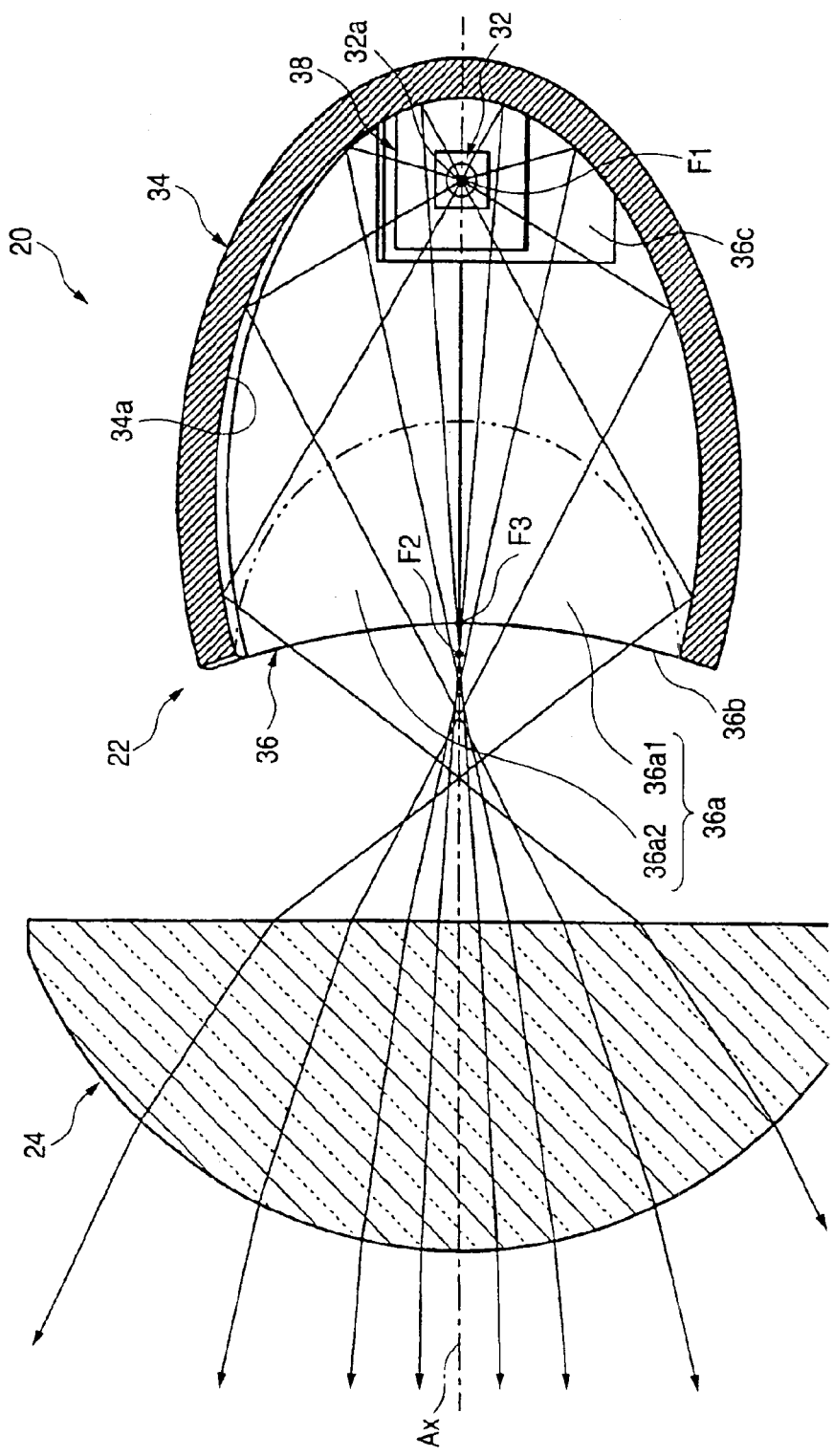
FIG. 4 is a plane cross-sectional view of the projector-type lamp unit.

FIG. 3 is a side cross-sectional view showing the lamp unit 20 as a single article. FIG. 4 is a plane cross-sectional view of the lamp unit.

As illustrated, the light source unit 22 of the lamp unit 20 is equipped with a light-emitting diode 32 serving as a light source; a reflector 34; and a light control member 36.

The light-emitting diode 32 is a white-light-emitting diode having a single light-emitting chip 32a measuring about 1 mm square. The light-emitting diode 32 is arranged on the optical axis Ax while being supported on a substrate 38, and is oriented in a direction extending 15° rightward of the optical axis Ax with respect to the vertically upward direction.

The reflector 34 is a substantially-dome-shaped member provided at a position higher than the light-emitting diode 32. The reflector 34 has a reflection surface 34a for reflecting the light output from the light-emitting diode 32 to be converged close to the optical axis Ax. The reflection surface 34a is formed such that a distance from the light-emitting diode 32 to the reflection surface 34a in the vertical direction assumes a value of about 10 mm.

The reflection surface 34a is formed into a substantially oblate spheroid shape that takes the optical axis Ax as a center axis. Specifically, the reflection surface 34a is set such that a cross-sectional profile thereof including the optical axis Ax is formed into a substantially oblate shape. An eccentricity is set so as to become gradually larger from the vertical cross section to the horizontal cross section. Here, a rear apex of an oblate constituting each cross section is set to a single position. The light-emitting diode 32 is arranged at a first focal point F1 of an oblate constituting a vertical cross section of the reflection surface 34a. The reflection surface 34a is arranged so as to reflect the light output from the light-emitting diode 32 to be converged close to the optical axis Ax. At that time, the light is converged substantially onto a second focal point F2 of the oblate within the vertical cross section including the optical axis Ax.

The projection lens 24 of the lamp unit 20 is formed from a plano-convex lens having a convex front surface and a plane rear surface. Upper and lower sides of the projection lens 24 are chamfered. The projection lens 24 is placed on the optical axis Ax such that a rear focal point F3 is situated slightly rearward with respect to the second focal point F2 of the reflection surface 34a of the reflector 34. An image on a focal plane including the rear focal point F3 is projected forward as an inverted image.

The light control member 36 is a plate-like member provided below the reflector 34 and formed substantially into the shape of a chevron when the lamp is viewed from the front. A light control surface 36a subjected to reflection surface treatment is formed on the upper surface of the light control member 36. The light control member 36 reflects upward a portion of the light reflected from the reflection surface 34a by means of the light control surface 36a. Thus, the light control member 36 performs a control operation for converting the light to be output upward from the projection lens 24 into light output downward from the projection lens 24, thereby enhancing the utilization factor of a luminous flux of the light output from the light-emitting diode 32.

Specifically, the light control surface 36a is formed from a horizontal cut-off formation surface 36a1 extending horizontally and leftward from the optical axis Ax, and an oblique cut-off formation surface 36a2 extending downward from the optical axis Ax in a rightward, oblique direction by an angle of 15°. A front edge of the light control surface 36a (i.e., a ridge line existing between the light control surface 36a and a front end surface 36b of the light control member 36) is formed so as to pass through the rear focal point F3 of the projection lens 24. Of the light output from the light-emitting diode 32, a portion of the light reflected from the reflection surface 34a of the reflector 34 enters the light control surface 36a of the light control member 36. The remainder of the light enters the projection lens 24 without modification. At that time, the light having entered the light control surface 36a is reflected upward by the light control surface 36a, to thereby enter the projection lens 24. The light is then output as downwardly-oriented light from the projection lens 24.

The front-end surface 36b of the light control member 36 is formed such that lateral ends of the front-end surface are curved forward when viewed in plane so as to correspond to a field curvature of the projection lens 24.

A substrate support section 36c is formed at the rear end of the light control member 36. The substrate 38 is secured on the light control member 36 by means of the substrate support section 36c. A lower edge section of the reflector 34 is fixed to the light control member 36. The light source unit 22A is secured on the lamp body 14 along the projection lens 24 by way of an unillustrated bracket.

Figure 5:
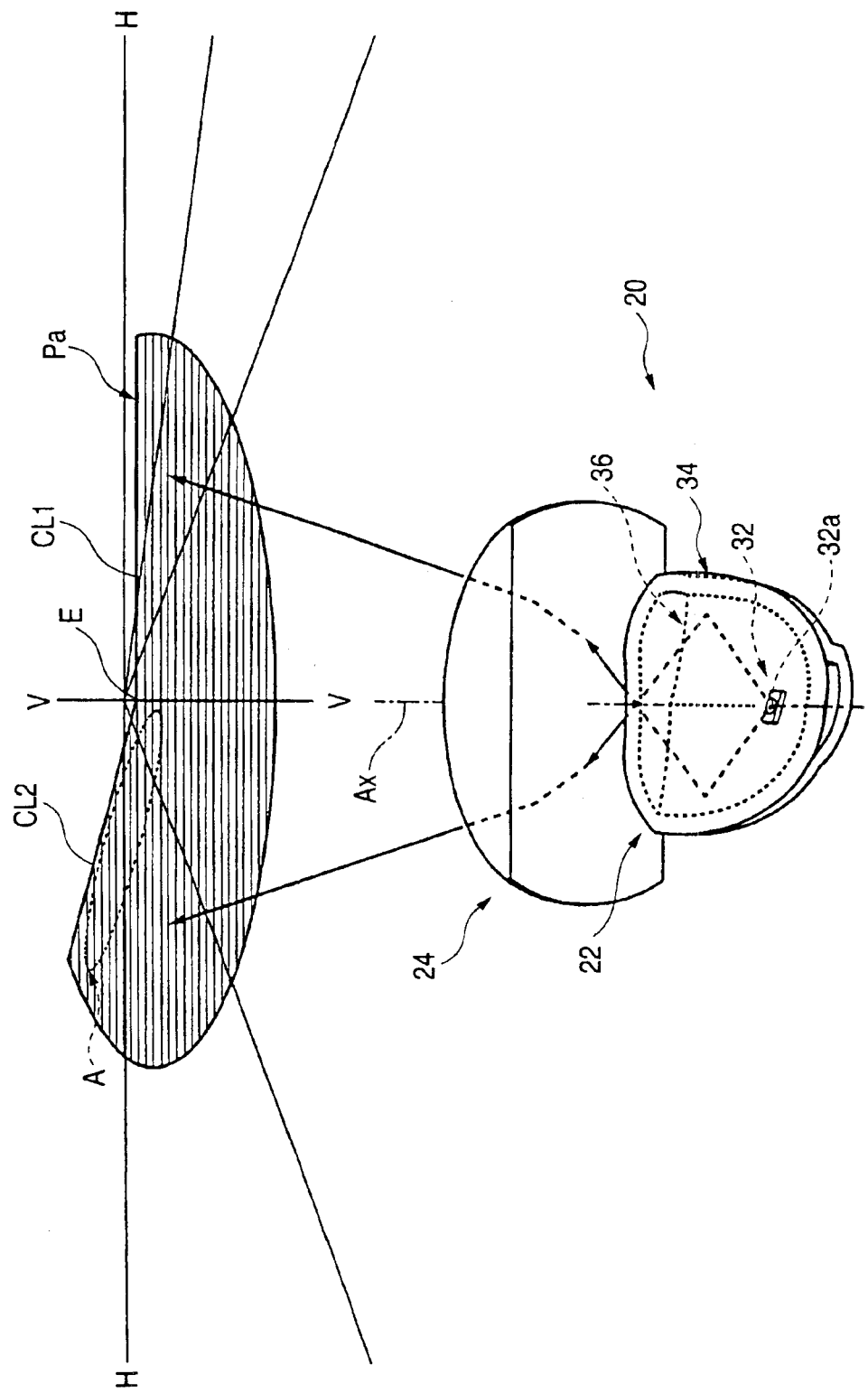
FIG. 5 is a perspective view showing a light distribution pattern—which is to be formed on the virtual vertical screen by means of radiation of the light output forward from the projector-type lamp unit—along with the lamp unit when viewed from the rear.

FIG. 5 is a perspective view showing the cut-off line formation pattern Pa—which is to be formed on the virtual vertical screen by means of the light output forward from the lamp unit 20—along the lamp unit 20 when viewed from the rear.

As illustrated, the cut-off line formation pattern Pa is formed as a light distribution pattern which has the horizontal cut-off line CL1 and the oblique cut-off line CL2 provided at an upper edge of the pattern and which has a certain degree of diffusion angle with a comparatively uniform distribution of luminous intensity.

At that time, the horizontal and oblique cut-off lines CL1, CL2 are clearly formed as reverse images of the horizontal cut-off formation surface 36a1 and the oblique cut-off formation surface 36a2, both constituting the light control surface 36a of the light control member 36, in the form of front edges.

A light distribution curve of the light output from the light-emitting diode generally has a distribution of luminous intensity, wherein maximum luminous intensity appears in the front of the light-emitting diode and the luminous intensity decreases as an angle with respect to the direction of the front of the light-emitting diode increases. In the embodiment, the light-emitting diode 32 is oriented in a direction extending 15° rightward of the optical axis Ax with reference to the upward vertical direction. Thereby, an area below the oblique cut-off line CL2 in the cut-off line formation pattern Pa; that is, an area A designated by broken lines shown in FIG. 5, is brightly radiated. As a result, the low-beam distribution pattern PL of left distribution light is made superior in distant visibility to a much greater extent.

In the embodiment, three lamp units 20 are provided. Hence, the cut-off line formation pattern Pa in the low-beam light distribution pattern PL shown in FIG. 2 corresponds to triple superimposition of the cut-off line formation pattern Pa shown in FIG. 5.

The configuration of the direct-projection-type lamp unit 40A will now be described.

Figure 6:
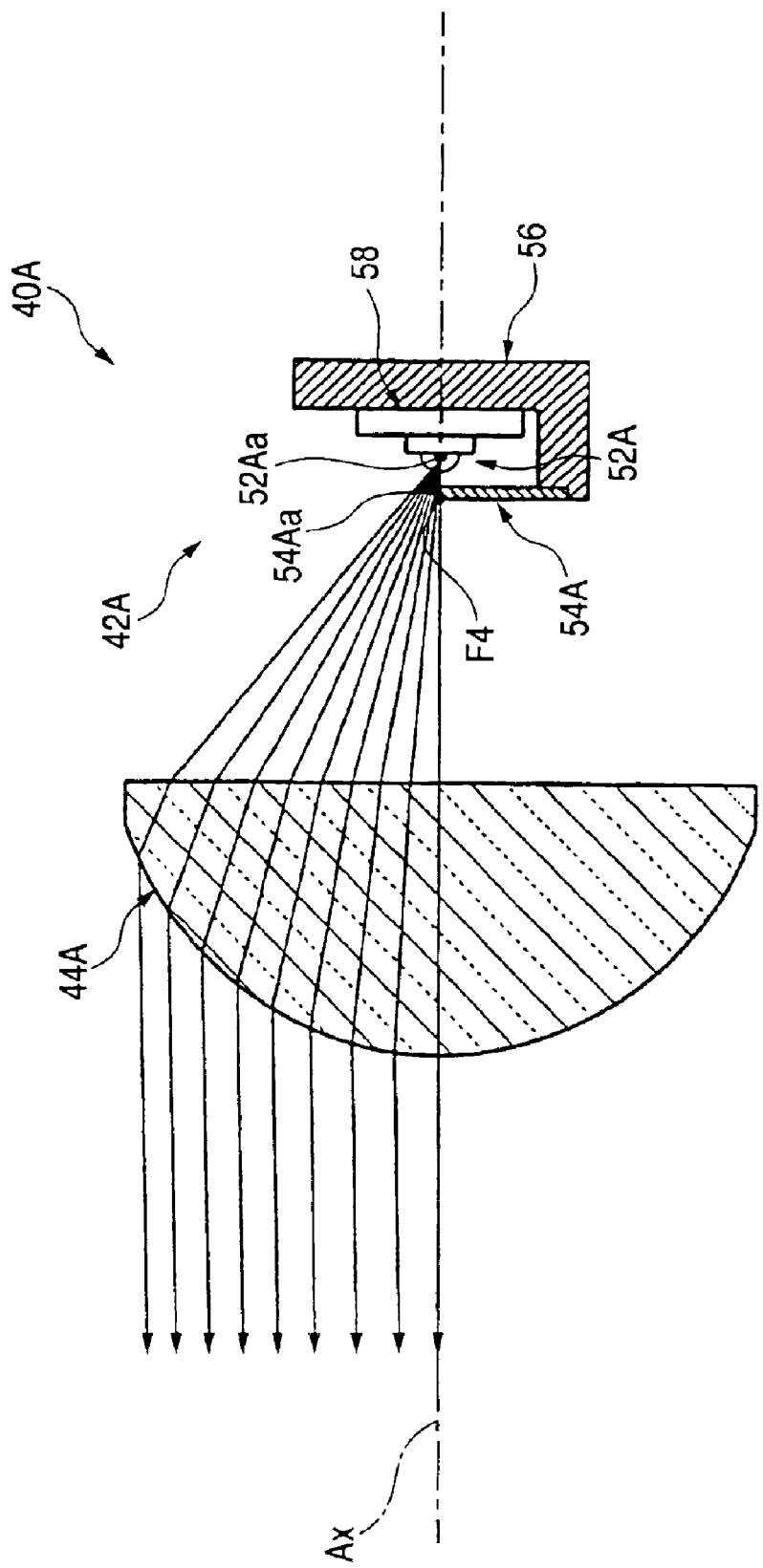
FIG. 6 is a side cross-sectional view showing a direct-projection-type lamp unit of the vehicle headlamp as a single article.
Figure 7:
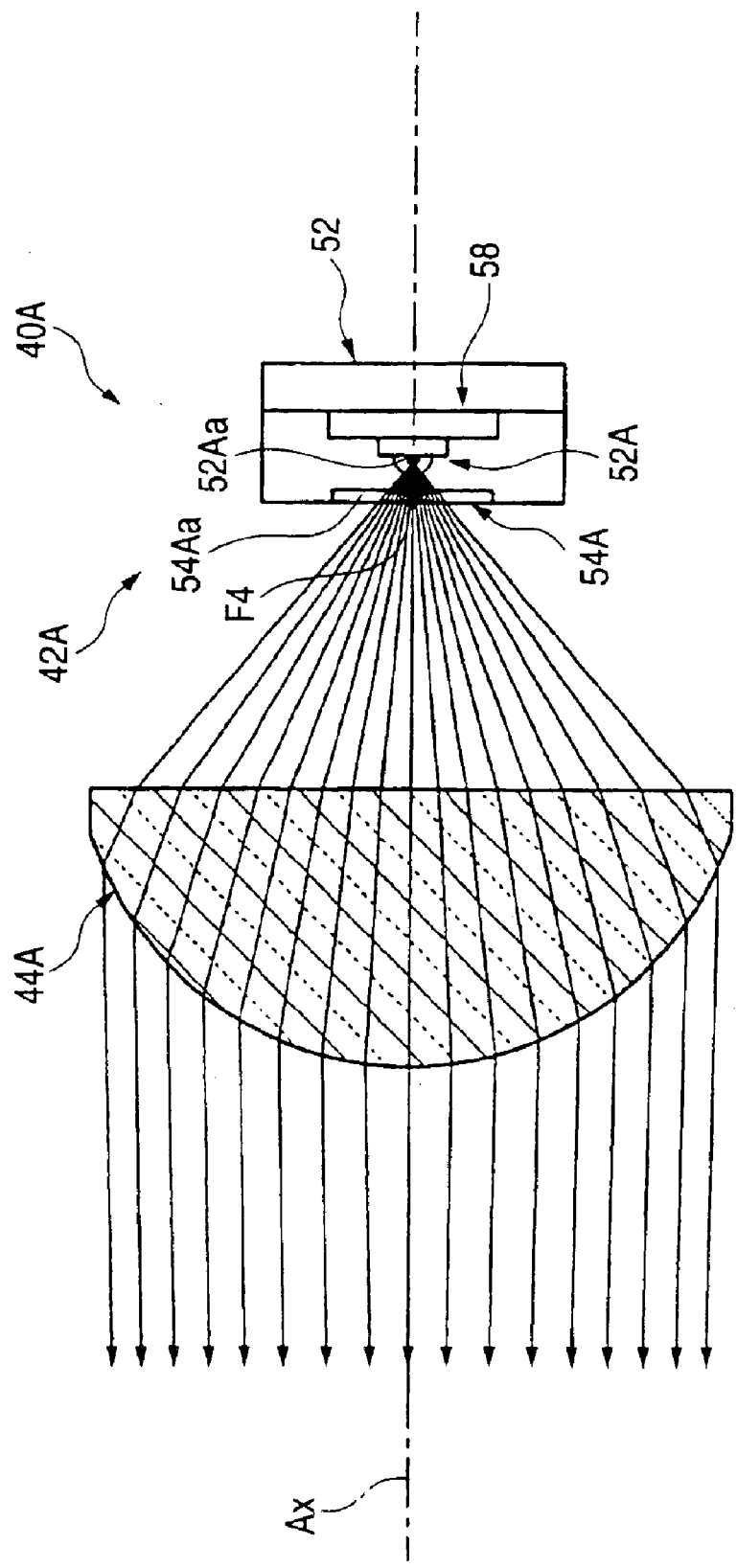
FIG. 7 is a plane cross-sectional view of the direct-projection-type lamp unit.

FIG. 6 is a side cross-sectional view showing the lamp unit 40A as a single article. FIG. 7 is a plane cross-sectional view of the lamp unit.

As illustrated, the light source unit 42A of the lamp unit 40A is equipped with a light-emitting diode 52A serving as a light source, and a shade 54A.

The light-emitting diode 52A is analogous in configuration to the light-emitting diode 32 of the lamp unit 20. The light-emitting diode 52A is fastened to a support member 56 via a substrate 58 while a light-emitting chip 52Aa is oriented forward of the headlamp on the optical axis Ax.

The shade 54A is a plate-like member that extends along a vertical plane orthogonal to the optical axis Ax ahead of and in the vicinity of the light-emitting diode 52A. An upper edge 54Aa of the shade 54A is fixed to the support member 56 so as to pass the optical axis Ax horizontally.

A front surface of the condenser lens 44A of the lamp unit 40A is formed from a plano-convex lens having a convex front surface and a flat rear surface. The condenser lens 44A is arranged on the optical axis Ax such that the rear focal point F4 of the condenser lens 44A is situated at a point of intersection between the upper edge 54Aa of the shade 54A and the optical axis Ax.

In the lamp unit 40A, the light output from the light-emitting diode 52A is converted into substantially-collimated light which converges slightly closer to the optical axis Ax by means of the condenser lens 44A, to thereby reflect and radiate the light forward. Of the light rays output from the light-emitting diode 52A, the light ray traveling downward with reference to the optical axis Ax is shielded by the shade 54A, to thereby prevent the output of upward-traveling light ahead of the lamp.

Figure 8:
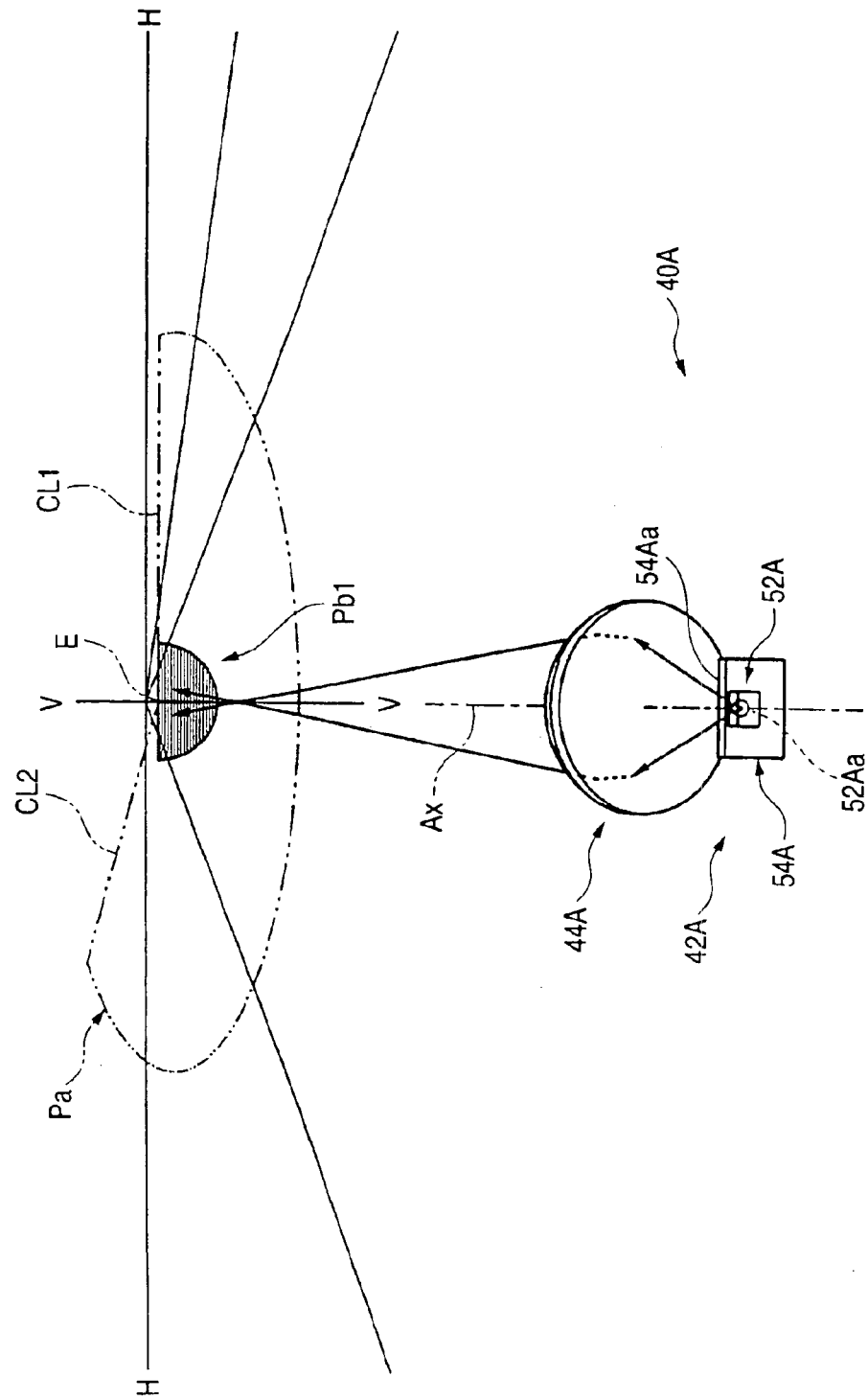
FIG. 8 is a perspective view showing a light distribution pattern—which is to be formed on the virtual vertical screen by means of radiation of the light output forward from the direct-projection-type lamp unit—along with the lamp unit when viewed from the rear.

FIG. 8 is a perspective view showing the small light distribution pattern Pb1—which is to be formed on the virtual vertical screen by means of the light output forward from the lamp unit 40A—along with the lamp unit 40A when viewed from the rear.

As illustrated, the small light distribution pattern Pb1 is formed as a substantially-semicircular, spot-shaped light distribution pattern which has a straight upper edge along the horizontal cut-off line CL1.

In the embodiment, the three lamp units 40A are arranged such that the optical axes Ax of the lamp units are slightly deviated from each other in the horizontal direction. As a result, the three small light distribution patterns Pb1 are formed so as to partially overlap each other along the horizontal cut-off line CL1 in the vicinity of the elbow point E.

Figure 9:
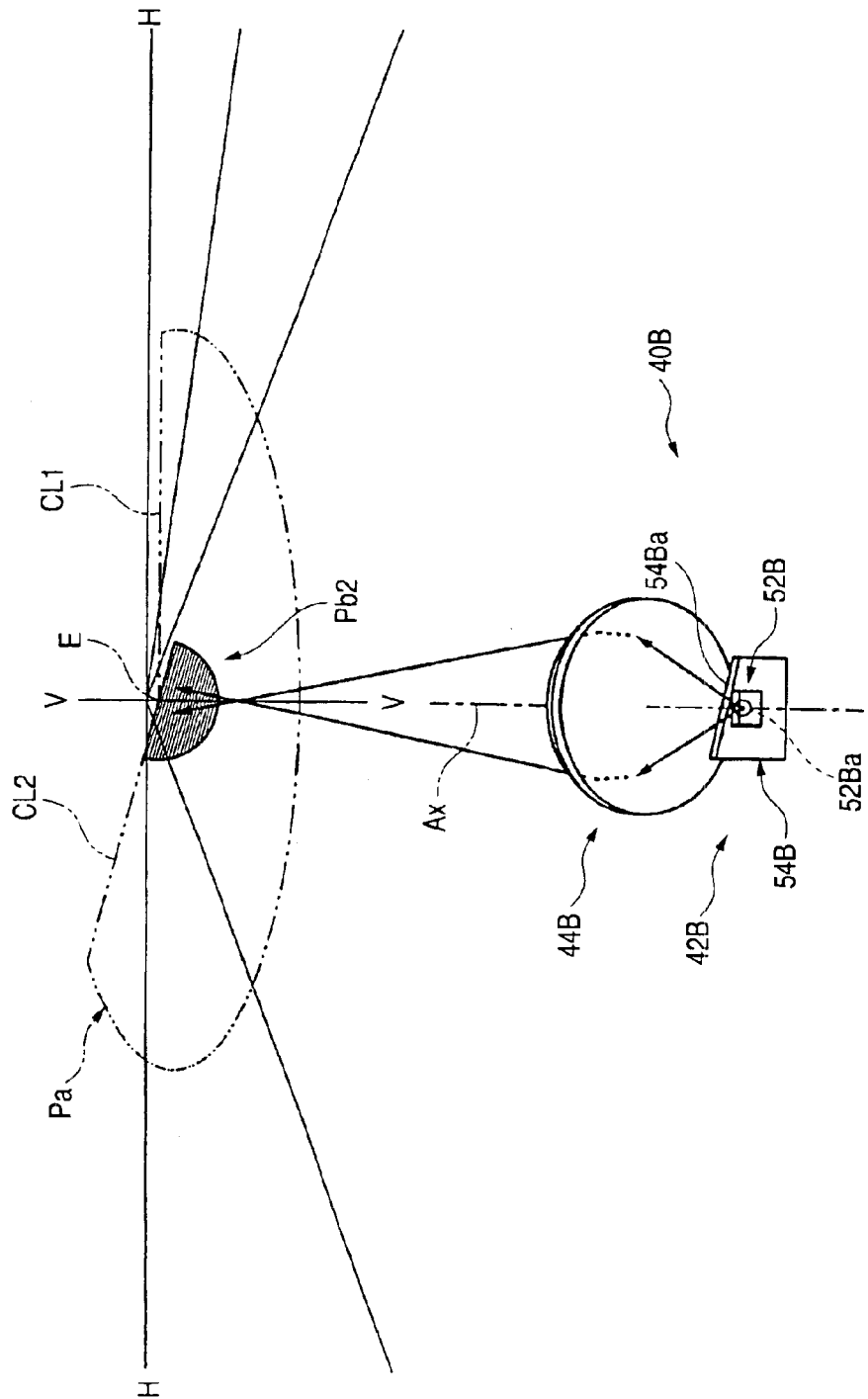
FIG. 9 is a perspective view showing a light distribution pattern—which is to be formed on the virtual vertical screen by means of radiation of the light output forward from another direct-projection-type lamp unit—along with the lamp unit when viewed from the rear.

FIG. 9 is a perspective view showing the small light distribution pattern Pb2—which is to be formed on the virtual vertical screen by means of the light output forward from the lamp unit 40B—along with the lamp unit 40B when viewed from the rear.

As illustrated, as in the case of the light source unit 42A of the lamp unit 40A, the light source unit 42B of the lamp unit 40B is equipped with the light-emitting diode 52B serving as a light source, and the shade 54B. However, the light source unit 42B is different from the light source unit 42A in that an upper edge 54Ba of the shade 54B crosses the optical axis Ax obliquely; that is, in a direction oriented downward by 15° with reference to the horizontal direction.

Thus, the upper edge 54Ba of the shade 54B is inclined. Hence, the small light distribution pattern Pb2 is formed into a substantially-semicircular, spot-shaped light distribution pattern having a straight upper edge along the oblique cut-off line CL2.

In the embodiment, the two lamp units 40B are arranged such that the optical axes Ax of the lamp units are slightly deviated from each other in an oblique direction. As a result, the two small light distribution patterns Pb2 are formed so as to partially overlap each other along the oblique cut-off line CL2 in the vicinity of the elbow point E.

As shown in FIG. 2, the hot zone formation pattern Pb is formed as a merged light distribution pattern from the three small light distribution patterns Pb1 and the two small light distribution patterns Pb2, so as to surround a point slightly left of the elbow point E below the horizontal and oblique cut-off lines CL1, CL2. As a result, visibility of a distant area on the road surface ahead of the vehicle is ensured.

Next, the configuration of the reflection-type lamp unit 60 will be described.

Figure 10:
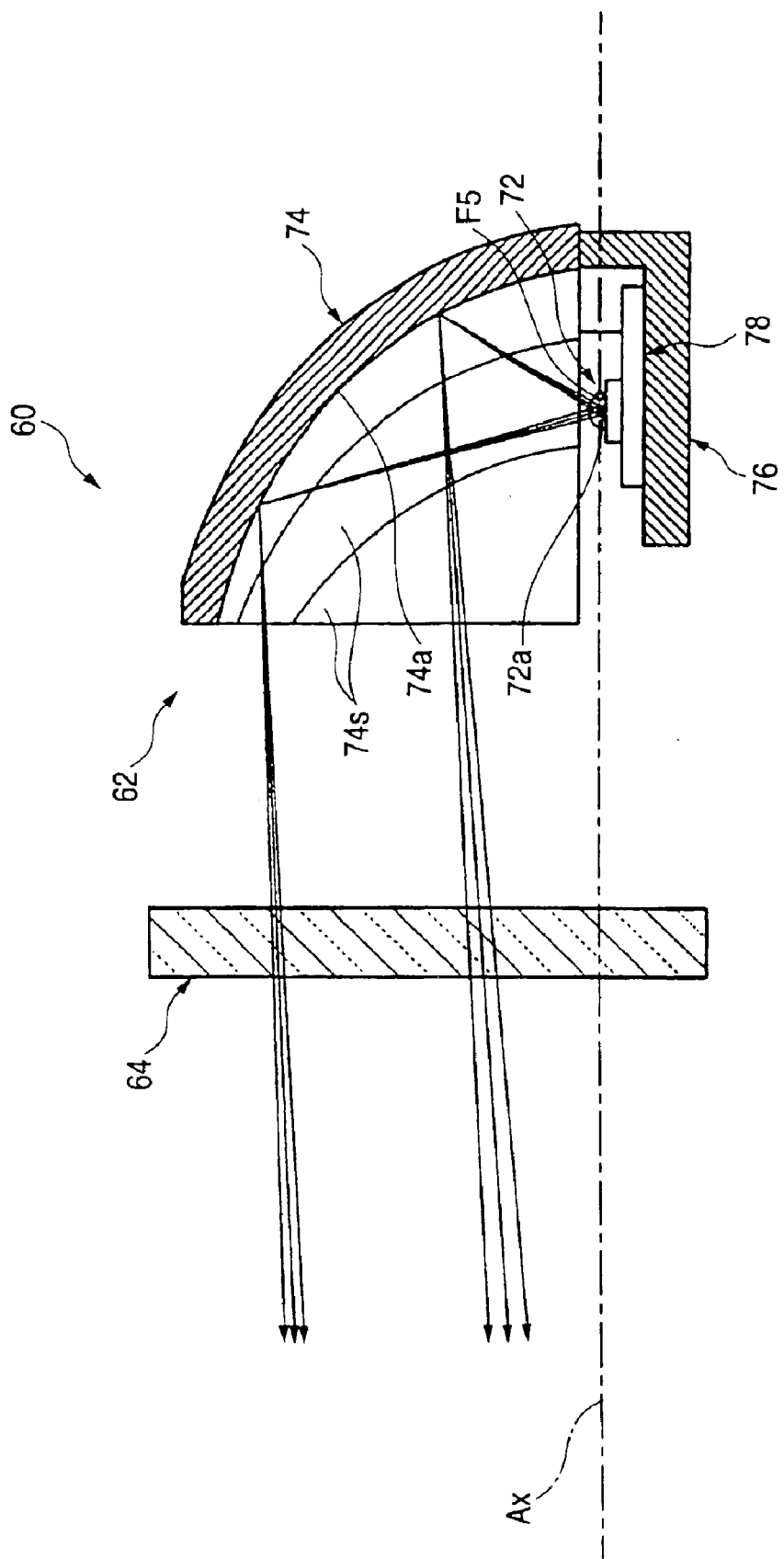
FIG. 10 is a side cross-sectional view showing a reflection-type lamp unit of the vehicle headlamp as a single article.
Figure 11:
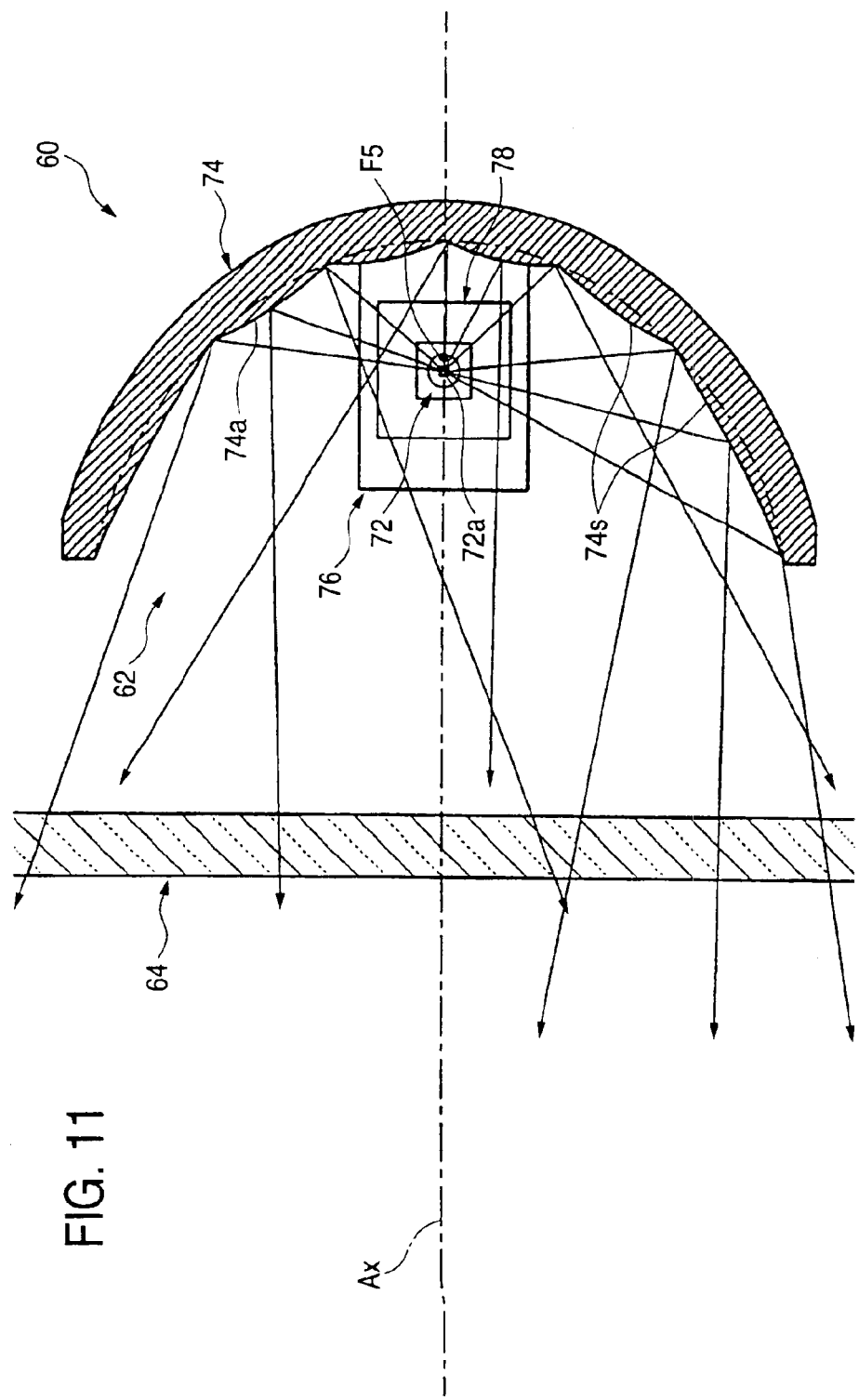
FIG. 11 is a plane cross-sectional view of the reflection-type lamp unit.

FIG. 10 is a side cross-sectional view showing the lamp unit 60 as a single article. FIG. 11 is a plane cross-sectional view of the lamp unit.

As illustrated, the light source unit 62 of the lamp unit 60 has a light-emitting diode 72 serving as a light source and a reflector 74.

The light-emitting diode 72 is analogous in configuration to the light-emitting diode 32 of the lamp unit 20. The light-emitting diode 72 is oriented upward in the vertical direction on the optical axis Ax and fastened to a support member 76 via a substrate 78 in this state.

The reflector 74 is provided at a position above the light-emitting diode 72 and has a reflection surface 74a of substantially-parabolic shape. The reflection surface 74a is formed such that a plurality of diffuse reflection elements 74s are formed in a paraboloid of revolution in the form of warp streaks, wherein the paraboloid of revolution takes the optical axis Ax as a center axis and also takes a position slightly rearward of the light-emitting chip 72a of the light-emitting diode 72 on the optical axis Ax as a focal point F5. The respective diffuse reflection elements 74s are set such that right and left diffuse reflection angles differ from each other. A lower end section of the reflector 74 is fastened to the support member 76.

In the lamp unit 60, the light output from the light-emitting diode 72 is reflected forward as slightly-downward right and left diffused light rays from the reflector 74. The thus-reflected light rays are radiated forward of the lamp via the translucent plate 64.

Figure 12:
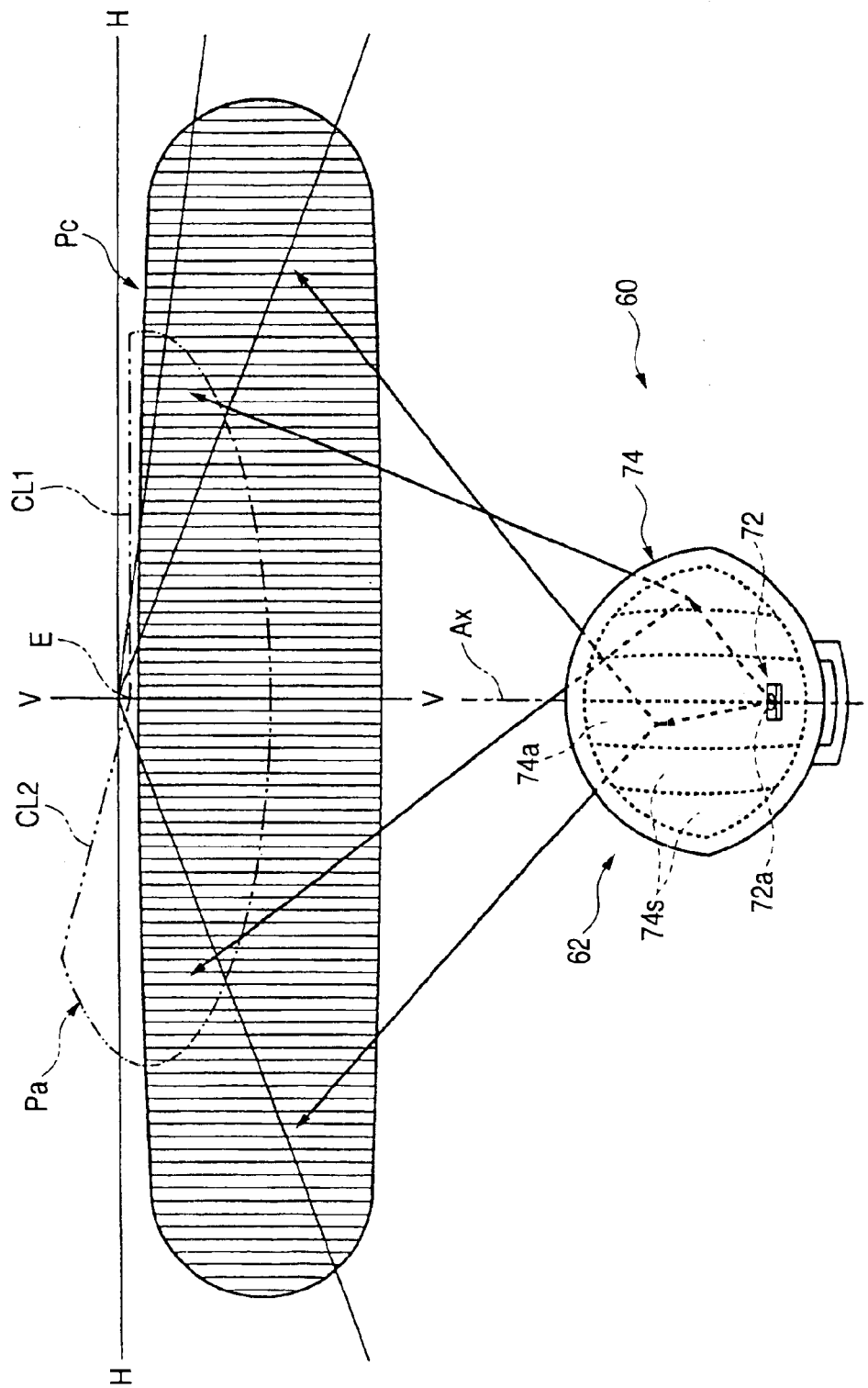
FIG. 12 is a perspective view showing a light distribution pattern—which is to be formed on the virtual vertical screen by means of radiation of the light output forward from the reflection-type lamp unit—along with the lamp unit when viewed from the rear.

FIG. 12 is a perspective view of the diffusion area formation pattern Pc to be formed on the virtual vertical screen by means of the light radiated forward from the lamp unit 60, along with the lamp unit 60 as viewed from the rear.

As illustrated, the diffusion area formation pattern Pc is formed at a position below the horizontal cut-off line CL1 so as to laterally and widely spread with respect to line V—V, which is a vertical line passing through H–V, thereby illuminating a wide range of the road surface ahead of the vehicle. At that time, the diffuse reflection elements 74s constituting the reflection surface 74a of the reflector 74 are set such that right and left diffuse reflection angles differ from each other. Hence, the diffusion area formation pattern Pc becomes a light distribution pattern whose luminous intensity gradually decreases toward an edge of the pattern.

In the embodiment, the three lamp units 60 are provided. Hence, the diffuse area formation pattern Pc in the low-beam light distribution pattern PL shown in FIG. 2 corresponds to triple superimposition of the diffusion area formation pattern Pc shown in FIG. 12.

As described in detail, the light vehicle headlamp 10 of the embodiment are configured to have the plurality of lamp units 20, 40A, 40B, and 60 having taken the light-emitting diodes 32, 52A, 52B, and 72 as light sources. An attempt can be made to make the respective lamp units 20, 40A, 40B, and 60 compact. Hence, a degree of freedom of shape of a vehicle headlamp 10 can be increased, thereby enabling an attempt to render the vehicle headlamp compact.

Further, the embodiment employs, as the plurality of lamp units, three types of lamp units of difference radiation modes; that is, the projector-type lamp unit 20, the direct-projection-type lamp units 40A, 40B, and the reflection-type lamp unit 60. Hence, the following working-effect can be yielded.

Specifically, the cut-off line formation pattern Pa is formed by the projector-type lamp unit 20 suitable for forming a light distribution pattern which has a certain degree of diffusion angle with a comparatively uniform distribution of luminous intensity. Further, the hot zone formation pattern Pb is formed by the direct-projection-type lamp units 40A, 40B suitable for forming the spot-shaped light distribution pattern. The diffusion area formation pattern Pc is formed by the reflection-type lamp unit 60 suitable for forming a light distribution pattern having a large diffusion angle. The low-beam light distribution pattern PL, which is formed as a merged light distribution pattern from these patterns, can be readily formed so as to assume a desired pattern geometry and a desired distribution of luminous intensity.

The lamp unit 20 of projector type is designed to project forward an image formed on a focal plane located rearward of the projection lens 24, and hence the cut-off line formation pattern Pa and the horizontal and oblique cut-off lines CL1, CL2 having a high contrast ratio can be formed. As a result, occurrence of upward light responsible for glaring can be minimized.

Further, in the embodiment, the hot zone formation pattern Pb is formed as a merged light distribution pattern formed from the three small light distribution patterns Pb1 and the two small light distribution patterns Pb2, wherein the light distribution patterns Pb1 are formed so as to partially overlap each other in the vicinity of the elbow point E and along the horizontal cut-off line CL1, and the distribution patterns Pb2 are formed so as to partially overlap each other in the vicinity of the elbow point E along the oblique cut-off line CL2. The hot zone formation pattern Pb is formed so as to surround a point slightly left of the elbow point E at a position below the horizontal and oblique cut-off lines CL1, CL2. Hence, sufficient visibility of a distant area on the road surface ahead of the vehicle can be ensured.

In the vehicle headlamp 10 of the embodiment, the eleven lamp units 20, 40A, 40B, and 60 are described to be arranged in three columns. As a matter of course, a total number of lamp units or the number and arrangement of the lamp units 20, 40A, 40B, and 60 can be changed as appropriate in accordance with the pattern geometry and the distribution of luminous intensity of an intended low-beam light distribution pattern PL.

In the embodiment, the reflection-type lamp unit 60 forms the diffusion area formation pattern Pc through use of the plurality of diffuse reflection elements 74s formed on the reflection surface 74a of the reflector 74. Instead, the diffuse area formation pattern Pc can also be formed by forming the reflection surface 74a from a paraboloid of revolution and a diffuse lens element on the translucent plate 64.

Further, the embodiment has described a case where the vehicle headlamp 10 is a low-beam headlamp. However, even when the vehicle headlamp 10 is a high-beam headlamp, use of a plurality of types of lamp units of different radiation modes enables formation of a high-beam light distribution pattern having a distribution of luminous intensity whose luminous intensity gradually decreases from the center to the periphery.

Figure 13:
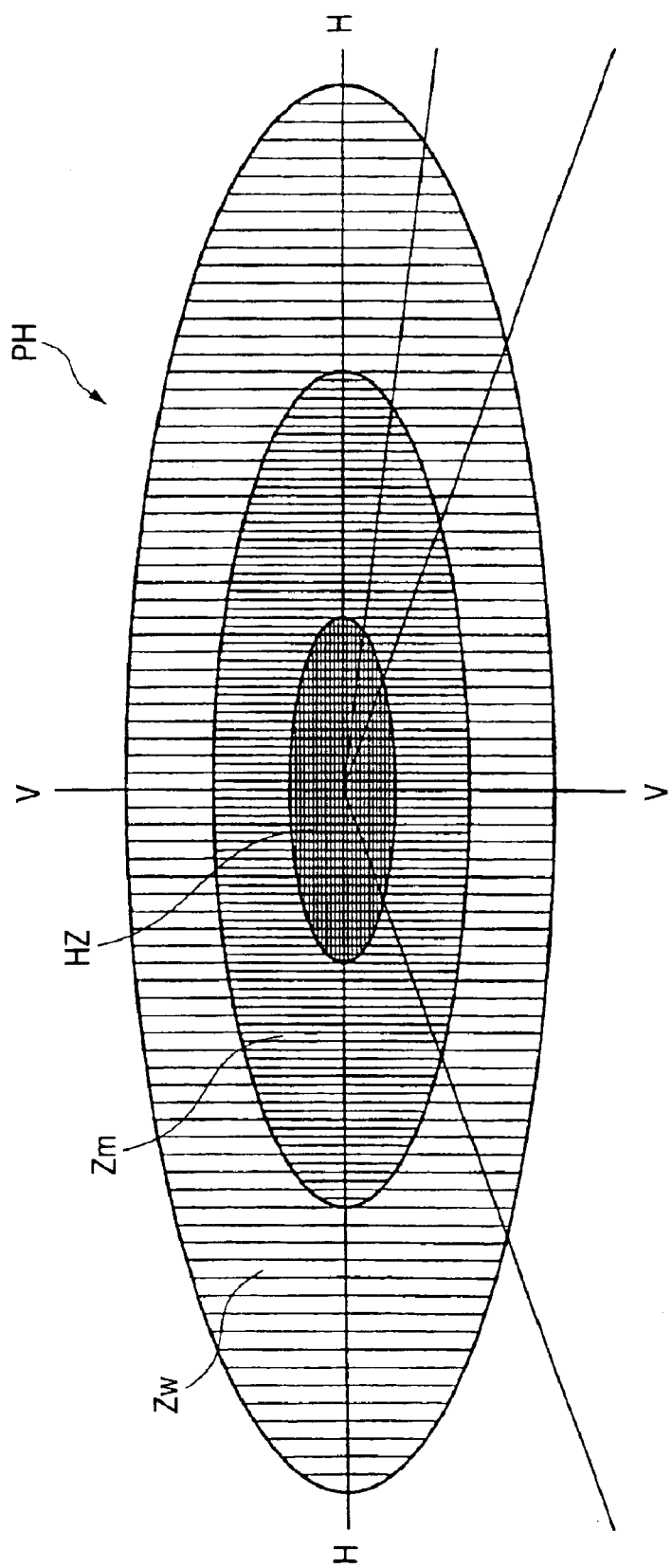
FIG. 13 is a perspective view showing a high-beam light distribution pattern, which is to be formed on the virtual vertical screen by means of radiation of the light output forward from the vehicle headlamp, when the vehicle headlamp is constituted as a high-beam headlamp.

As shown in FIG. 13, there can be formed, for example, a high-beam light distribution pattern PH having a distribution of luminous intensity whose luminous intensity decreases from the center to the periphery in order of a hot zone HZ, a middle diffusion area Zm, and a wide diffusion area Zw. At that time, the hot zone HZ is formed by means of radiation of light output from the direct-projection-type lamp unit, and the middle diffusion area Zm is formed by means of radiation of light output from the projector-type lamp unit 20. Further, the wide diffusion area Zw is formed by means of the reflection-type lamp unit.

The high-beam headlamp obviates a necessity for formation of a cut-off line. Hence, even when two types of lamp units are appropriately selected from three types of lamp units consisting of the projector-type lamp unit, the direct-projection-type lamp unit, and the reflection-type lamp unit, a high-beam light distribution pattern can be readily formed in a desired pattern geometry and a desired distribution of luminous intensity.

What is claimed is:

1. A vehicle headlamp operable to form a predetermined light distribution pattern comprising:

a plurality of lamp units employing semiconductor light-emitting elements as light sources, wherein the plurality of lamp units include a lamp unit of direct projection type which is constructed to radiate direct light output from the light source ahead of the lamp by way of a condenser lens provided forward of the light source; and at least one type of lamp unit selected from a lamp unit of projector type which is constructed to reflect light output to be converged in a forward direction from a light source by means of a reflector and to radiate the reflected light ahead of a lamp by way of a projection lens provided ahead of the reflector, and from a lamp unit of reflection type which is constructed to reflect light output from the light source ahead of the lamp by means of the reflector.

2. The vehicle headlamp according to claim 1, wherein the light distribution pattern is a low-beam light distribution pattern, and a cut-off line of the low-beam light distribution pattern is formed by means of the lamp unit of projector type.

3. A vehicle headlamp operable to form a predetermined light distribution pattern comprising:

a plurality of lamp units employing semiconductor light-emitting elements as light sources, wherein the plurality of lamp units include a lamp unit of direct projection type; and at least one type of lamp unit selected from a lamp unit of projector type, and a lamp unit of reflection type.

4. The vehicle headlamp according to claim 3, further comprising a light source, a reflector, and a projection lens and wherein the lamp unit of projector type reflects light output from the light source to be converged in a forward direction by means of the reflector and radiates the reflected light by way of the projection lens provided ahead of the reflector.

5. The vehicle headlamp according to claim 3, further comprising a light source and a condenser lens, and wherein the lamp unit of direct projection type radiates direct light output from the light source by way of the condenser lens provided forward of the light source.

6. The vehicle headlamp according to claim 3, further comprising a light source and a reflector, and wherein the lamp unit of reflection type reflects light output from the light source by means of the reflector.

7. The vehicle headlamp according to claim 3, wherein the light distribution pattern is a low-beam light distribution pattern, and a cut-off line of the low-beam light distribution pattern is formed by means of the lamp unit of projector type.

\* \* \* \* \*